Dec. 4, 1934.                    H. L. BLUM                    1,982,631
                                  TOASTER
                             Filed April 20, 1932
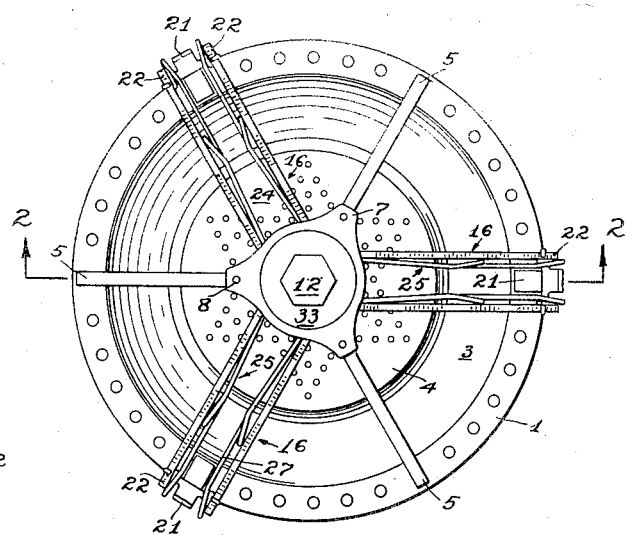
Fig. 1.
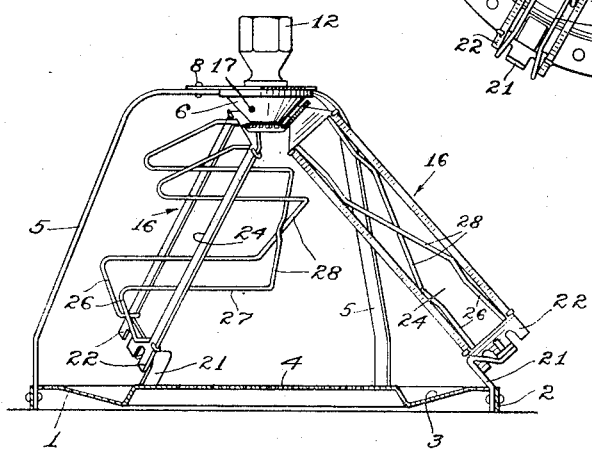
Fig. 3.
Fig. 2.
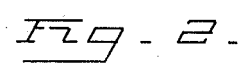
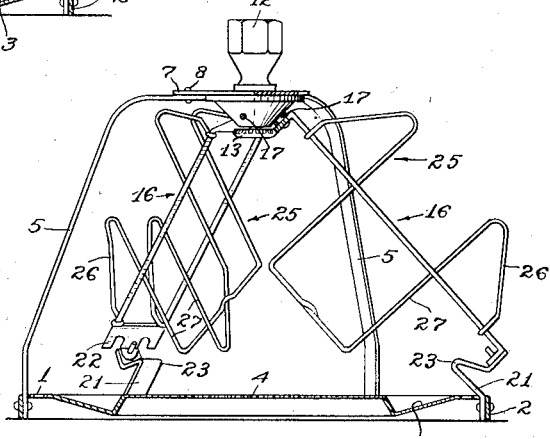
Fig. 4.
INVENTOR.
HOSMER L. BLUM.
BY
ATTORNEY Patented Dec. 4, 1934

1,982,631

UNITED STATES PATENT OFFICE 1,982,631

TOASTER

Hosmer L. Blum, San Francisco, Calif.

Application April 20, 1932, Serial No. 606,388

12 Claims. (Cl. 53—5)

This invention relates to an improvement in toasters, and is a continuation in part of my copending application Serial Number 422,515, dated January 22, 1930.

It is one object of this invention to provide a simple device by which bread may be effectively toasted over a gas flame or other form of heat, which device shall operate within a minimum diameter, whereby to conserve space on a cooking device.

Another object is to provide a device for toasting bread or other similar material in a simple and efficient way, whereby both sides of the bread may be exposed to the heat radiation without removing the bread from its holder or support, and without touching it with the fingers.

Another object is to provide, in a device having the above characteristics, means for simultaneously turning the toast about their several axes for subjecting opposite sides of the toast to the heat radiating element, and also to move the toast supports to an intermediate position to permit the ready removal of the slices.

A further object is to provide in a device having the above characteristics, a single actuating means for simultaneously changing the positions of the several slices of toast.

The above and other objects will be apparent throughout the further description of the invention when taken in connection with the accompanying drawing, wherein like reference characters refer to like parts. It is to be distinctly understood that the drawing is not a definition of the invention, this being defined by the appended claims.

In the drawing—

Fig. 1 is a top plan view of a device embodying the invention, showing the bread carriers in loading position.

Fig. 2 is a sectional view taken on line 2—2 of Fig. 1.

Fig. 3 is a similar view to Fig. 2, showing the bread carriers in toasting position, and Fig. 4 is a detailed sectional view of the top and actuating means.

Referring to the drawing, one form of the device comprises a base 1, which may be in the form of a circular disc, provided at its periphery with an annular flange 2, the latter being adapted to support the device. The disc 1 is further provided with a corrugation, groove or annular channel 3, for taking care of the contraction and expansion of the disc when the latter is subject to varied temperatures and thereby preventing distortion of the base during such contraction and expansion. The central portion 4 of the disc, formed by the annular groove 3, is perforated, and comprises one example of a heat diffusing element, the latter lying in a horizontal plane and extending radially outwardly from a central radial axis, the purpose of which will hereinafter be pointed out. The disc 1 may also have perforations adjacent its peripheral edge for exhaust of combusted gases.

Supports 5 are secured at their lowermost ends to the base and extend upwardly, the upper ends of which are adapted to support an inverted frusto conical shaped top member 6, the latter being supplied with projections or ears 7 extending horizontally outwardly from the upper edges thereof and engaging corresponding upper ends of the supports 5 and also providing a plate which overlies the central portion of the apparatus. The upper ends of the supports 5 and ears 7 may be secured together by any suitable means, such as rivets 8.

Referring to Fig. 4, the lower end of the cone shaped member 6 is provided with an annularly upturned flange 9, and adapted to receive a vertical shaft 10. The shaft 10 terminates at its upper end with a reduced portion 11 adapted to receive an actuating member or knob 12. The lower end of the shaft is provided with a bevelled gear 13 which meshes with a plurality of gears 14. The number of gears 14 will depend on the number of bread carriers employed. Each gear 14 is secured to a flange 15 formed on a bar 16 of the bread carrier, a stud bearing 17 being secured to the conical surface of the member 6, and extending through the gear 14 and flange 15, and having a head 18 at its lower end which bears against the lowermost face of the flange 15. A washer or spacer member 19 may be provided between each of the flanges 15 and the cooperating outer surfaces of the member 6 for providing a bearing surface on which the flange 15 and gear 14 may turn.

Each bar 16 inclines outwardly and downwardly from the conical top portion 6 at a selected angle, and its lower end is suitably pivotally mounted on a bracket 21, which is secured to the peripheral flange 2 on the base. The inclination of the angle of the bar 16 is a very important feature of the device, as it has been found, by experiment, that when a horizontal diffusing element is employed, it is preferable that the angle of the bar 16, which supports the bread carrier, be positioned at an angle between forty and fifty degrees with respect to the diffusing element so that the heat diverging from the diffusing element is more equally distributed over the surface of the bread, and consequently toasts the surfaces of the bread evenly. The angle of inclination of the axis of rotation of the racks also places the axis of rotation at an oblique angle to the radial or vertical axis of the support, as best shown in Figs. 2 and 3.

It can be seen from the drawing, that the lower portion of the toast is near the diffusing element while the upper portion of the toast is further from the diffusing element, but is subject to the direct rays of the heat.

Extensions 22 are formed at the lower end of the bar 16, and a stop 23 is formed on each bracket at such point that it will be abutted by either extension 22, and thereby limit the degree of rotation of such bar. Longitudinal slot 24 is formed in each bar, and is of a length and width to receive the usual slice of bread. It is to be understood that the bar 16 may be formed of a pair of spaced bars suitably connected at respective upper and lower ends, as will be obvious to those skilled in the art.

Racks 25 are secured to the bars 16 respectively. Each rack consists of two links of wire or a bar bent into the form of a U, with the free ends or legs 26 bent outwardly and backwardly, and engaging their respective bar. The longer legs 27 of each rack extend through the slot 24 of the bar, and the legs 28 forming the bottom of the U are adapted to cross one another, as shown, so that when a slice of bread is inserted through the slot 24 in the bar, the bread will come to rest on the cross legs, the latter holding the bread in position. From this description of bar 16 and rack 25 and the mounting thereof relative to the top and base, it is obvious that the axes of rotation of the respective racks converge from the bottom toward the top.

The lower free ends of the racks are an important feature of the invention, and this portion or leg extends upwardly or outwardly from the vertical axis of the toaster, and provides a desirable support for the material to be toasted, and at the same time causes the device to operate within a smaller diameter, which feature is important to conserve space on the top of a cooking device. This feature can best be understood by observing the drawing, where it will be noted from Fig. 1 that the bread carriers operate to turn the toast within a diameter substantially the same as the greatest diameter of the device.

Referring again to the drawing, and more particularly Fig. 4, means are provided for insulating the actuating knob 12 from the heat of the diffusing element, which means includes the air space 30 within the conical member 6, and an asbestos or similar heat insulator 31 carried by an annular shoulder 32 provided at the periphery of the member 6. By providing the air space 30, together with the heat insulator 31, the knob 12 is maintained sufficiently cool at all times to permit frequent handling of the knob 12 by the operator's hand. A cover member 33 rests upon the insulator 31 and is also placed within the annular shoulder 32. This cover member 33 is provided with an opening in its center providing an annular flange 34 for receiving the actuating shaft and maintaining the same in proper aligned position.

Fig. 1 shows the bread carriers in loading position. A slice of bread being inserted in each of the carriers will rest at their inner sides on the cross legs 28 of the racks. The lower portion of the slice may extend into the channel or groove 2, depending upon the length of the slot 24 and the degree of inclination of the bar with respect to the base. Upon turning the knob 12, the gearing is driven and the carriers are rotated until the slices of bread are turned to a position at right angles to the loading position. When the bread has been sufficiently toasted on the side exposed to the heat diffusing element, the knob is rotated to invert the slice of bread to toast the opposite side thereof.

It will be noted that each carrier is of such depth that the average slice of bread is so supported therein that when the carrier is turned, the slice of bread is turned approximately on its lateral axis, thereby greatly reducing the size of a toaster necessary to accommodate a plurality of slices of bread for toasting over a gas or other burner.

A further important feature of the present invention is the extremely simple and rugged manner in which the toaster may be produced, that will operate in the desired manner and which is very cheap to manufacture.

While only one form of the invention has been illustrated and described, it will be apparent to those skilled in the art that certain changes, modifications, substitutions, additions and omissions may be made in the structure of the device without departing from the spirit and scope of the appended claims.

I claim:—

1. A toaster comprising a perforated base, a top member supported on the base, a plurality of longitudinally slotted members pivotally mounted at their ends on the top and base respectively, racks carried by the slotted members respectively, each rack extending upon opposite sides of the slotted member carrying it and adapted to receive and support the material to be toasted that is inserted in the slotted member, and means to rotate the slotted members simultaneously whereby to rotate the material to be toasted on the axis thereof.

2. A toaster comprising a perforated substantially flat base, a top member supported on said base, a plurality of longitudinally slotted members pivotally mounted at their ends at the top and base respectively, racks carried by said slotted members and adapted to support material to be toasted, the said slotted members having fixed axes of rotation, and means for simultaneously turning said slotted members about said axes, whereby to rotate simultaneously the material to be toasted about the axes thereof.

3. In a toaster device, a heat diffusing element, a plurality of rotatably mounted receiving racks for toastable material, means for rotating said plurality of racks in unison on their respective axes of rotation, the axis of rotation of said respective racks extending upwardly relative to the heat diffusing element and radially inwardly relative to the radial axis of the heat diffusing element, and said respective racks being adapted for receiving and supporting a piece of toastable material so that a portion of said material may extend on at least one side of said axis of rotation of the rack, the axis of rotation of said racks converging relative to each other from bottom to top, and said heat diffusing element being sufficiently near the horizontal in vertical cross-section to provide an open area between the heat diffusing element and the upper converging portions of the racks.

4. In a toaster device, a heat diffusing element, a plurality of rotatably mounted receiving racks for toastable material, each of said racks being mounted on an axis of rotation which is fixed relative to the heat diffusing element, means for rotating said plurality of racks in unison on their respective axes of rotation, the axis of rotation of said respective racks extending upwardly relative to the heat diffusing element and radially inwardly relative to the radial axis of the heat diffusing element, and said respective racks being adapted for receiving and supporting a piece of toastable material so that a portion of said material may extend on at least one side of said axis of rotation of the rack, the axes of rotation of said racks converging relative to each other from bottom to top in overlying relation to the heat diffusing element, said heat diffusing element being sufficiently near the horizontal in vertical cross-section to provide an open area between the heat diffusing element and the upper converging portions of the racks.

5. In a toaster device, a rack support member providing a base, a plurality of receiving racks rotatably mounted on respective axes of rotation which are fixed relative to the base support member, means for rotating said plurality of racks in unison on their respective axes of rotation, each of said racks extending upwardly relative to the base support member and radially inwardly relative to the radial axis of the said support member and each rack having a portion disposed on at least one side of the axis of rotation of the rack for receiving a slice of material to be toasted, said last mentioned portion being adapted for movement inwardly and downwardly relative to the radial axis of the support member upon operation of the means to rotate the racks in unison.

6. A toaster device comprising a base which includes a heat radiating member, a plurality of rack members upwardly and radially inwardly inclined relative to the heat radiating member, said racks being adapted to receive and support a product to be toasted, said rack members each being supported on a pivotal axis fixed relative to the base and having an opening to receive material to be toasted, said opening extending on opposite sides of the said pivotal axis, and means to rock said rack members rotatively in unison on the respective pivotal axes of the racks.

7. A toaster device comprising a base which includes a heat radiating member, a plurality of upwardly disposed rack members inclined radially inwardly relative to the radial axis of the said heater member and adapted to receive and support a product to be toasted, said rack members each being pivotally supported on said base on a fixed pivotal axis about which the said rack is adapted to rotatively rock, said rack member extending on opposite sides of its pivotal axis, and means to rock said rack members rotatively in unison on the respective pivotal axis thereof.

8. A toaster device comprising a substantially horizontal heating element, a plurality of upwardly disposed rack members inclined radially inwardly relative to the radial axis of the heater member, and adapted to receive and support a product to be toasted, each of said rack members being mounted for rotatively rocking about a pivotal axis fixed relative to said heating element, said rack member having a receiving opening for material to be toasted extending on opposite sides of the pivotal axis thereof, and means to rotatively rock said rack members in unison on the respective pivotal axis thereof.

9. A toaster comprising a base including a heat radiating element, a top member supported on the base, a plurality of racks supported at top and bottom for rotative rocking on respective fixed pivotal axes which are outwardly and downwardly inclined from said top, said racks extending on opposite sides of their respective axes of rotative rocking and adapted to support a product on said opposite sides of the pivotal axis of the rack, and means to rotatively rock the racks simultaneously, whereby to rotate said product on an axis centrally of said product.

10. A toaster comprising a base including a heat radiating member, a top member supported on the base in overlying spaced relation to the heat radiating member, a plurality of racks pivotally mounted at their ends on the top and base respectively with their respective pivotal axes relatively converging from bottom to top, said racks being adapted to receive a piece of toastable material on opposite sides of the pivotal axis thereof, and means to rotate the racks simultaneously.

11. A toaster comprising a base including a heat radiating member, a top member supported on said base in overlying spaced relation to the heat radiating member, a plurality of inclined rotatably rockable racks each supported on a fixed pivotal axis between said base and said top, said rack extending outwardly laterally from its said pivotal axis and being adapted for supporting a piece of material to be toasted, the said pivotal axis of the respective racks converging from bottom to top, and means for rotatively rocking said plurality of racks in unison, the incline of the axis of rotation of the racks providing an open area overlying the heat radiating member, and said racks, upon rotative rocking thereof, being adapted for moving one laterally extended portion initially inwardly and through said open area.

12. A toaster device including a support body, a plurality of racks each mounted on the support for rotative rocking on a pivotal axis and being adapted for receiving and supporting a slice of toastable material so that one portion of said material may extend laterally on at least one side of said pivotal axis, said racks being disposed on an incline upwardly and radially inwardly relative to the support body so as to converge adjacent the upper portions thereof thereby providing an open area intermediate said support body and said upper converged portions of the racks, and means for rotatably rocking said plurality of racks in unison, said last mentioned means being adapted for moving a material supporting portion of the rack initially inwardly relative to the axis of the support body.

HOSMER L. BLUM.